(12) United States Patent
Espinosa

(10) Patent No.: US 8,915,093 B2
(45) Date of Patent: Dec. 23, 2014

(54) VACUUM STORAGE APPARATUS WITH SLIDING DRAWERS

(71) Applicant: Edward P. Espinosa, Madrid (ES)

(72) Inventor: Edward P. Espinosa, Madrid (ES)

(73) Assignee: Jeffrey S. Melcher, Washington, DC (US)

( * ) Notice: Subject to any disclaimer, the term of this patent is extended or adjusted under 35 U.S.C. 154(b) by 0 days.

(21) Appl. No.: 13/771,174

(22) Filed: Feb. 20, 2013

(65) Prior Publication Data

US 2013/0156912 A1  Jun. 20, 2013

Related U.S. Application Data

(63) Continuation of application No. 12/985,381, filed on Jan. 6, 2011, now Pat. No. 8,402,775, which is a continuation of application No. 11/939,076, filed on Nov. 13, 2007, now Pat. No. 7,895,848, which is a continuation of application No. 11/048,141, filed on Feb. 1, 2005, now Pat. No. 7,325,409.

(60) Provisional application No. 60/555,991, filed on Mar. 24, 2004.

(51) Int. Cl.

| F25B 19/00 | (2006.01) |
|---|---|
| B65D 81/20 | (2006.01) |
| A47F 3/00 | (2006.01) |
| F25D 17/04 | (2006.01) |
| A47F 7/00 | (2006.01) |
| F25D 23/02 | (2006.01) |

(52) U.S. Cl.
CPC ............ *B65D 81/2007* (2013.01); *A47F 3/001* (2013.01); *F25D 2317/043* (2013.01); *F25D 17/042* (2013.01); *A47F 7/0071* (2013.01); *F25D 23/021* (2013.01)
USPC ......................................................... 62/100

(58) Field of Classification Search
CPC .............. F25D 31/00; F25B 1/00; F25B 1/06; F25B 1/08
USPC ............ 62/100, 169, 170, 268, 270; 426/231, 426/524
See application file for complete search history.

(56) References Cited

U.S. PATENT DOCUMENTS

| 1,404,400 A | 1/1922 | Moon |
| 1,594,512 A | 8/1926 | Der Lippe-Lipski |
| 2,388,746 A | 11/1945 | Knapp |
| 2,425,816 A | 8/1947 | Maxson |

(Continued)

FOREIGN PATENT DOCUMENTS

| DE | 19858254 A1 | 6/2000 |
| DE | 202004011287 U1 | 9/2004 |

(Continued)

OTHER PUBLICATIONS

Final Office Action mailed Feb. 2, 2011, in U.S. Appl. No. 12/026,870.

(Continued)

*Primary Examiner* — Mohammad M Ali
(74) *Attorney, Agent, or Firm* — Jeffrey S. Melcher; Manelli Selter PLLC

(57) ABSTRACT

Provided is a modular vacuum storage apparatus and method for storing, dispensing, preserving and shipping perishable items.

22 Claims, 4 Drawing Sheets

(56) References Cited

U.S. PATENT DOCUMENTS

| Patent | Date | Name | Ref |
|---|---|---|---|
| 2,823,833 A | 2/1958 | Bauerlein | |
| 2,894,845 A | 7/1959 | Stoddard | |
| 3,116,610 A | 1/1964 | Whitmore | |
| 3,216,214 A | 11/1965 | Gasbarro | |
| 4,222,276 A | 9/1980 | DeRogatis | |
| 4,331,690 A * | 5/1982 | Bradshaw | 426/233 |
| 4,557,118 A | 12/1985 | Pink | |
| 4,841,661 A | 6/1989 | Moore | |
| 4,909,014 A | 3/1990 | Kobayashi | |
| 5,046,332 A | 9/1991 | Herrmann | |
| 5,095,717 A | 3/1992 | Germi | |
| D326,663 S | 6/1992 | Kim | |
| 5,142,970 A | 9/1992 | ErkenBrack | |
| 5,157,940 A | 10/1992 | Bertu | |
| 5,195,427 A | 3/1993 | Germano | |
| 5,271,240 A | 12/1993 | Detrick | |
| 5,332,095 A | 7/1994 | Wu | |
| 5,347,918 A | 9/1994 | Chen | |
| 5,390,809 A | 2/1995 | Lin | |
| 5,398,811 A | 3/1995 | Latella | |
| 5,450,963 A * | 9/1995 | Carson | 206/524.8 |
| 5,494,165 A | 2/1996 | Detrick | |
| 5,522,216 A | 6/1996 | Park | |
| 5,605,047 A | 2/1997 | Park | |
| 5,628,404 A | 5/1997 | Hendrix | |
| 5,806,575 A | 9/1998 | Tsay | |
| 5,946,919 A | 9/1999 | McKinney | |
| 5,964,255 A | 10/1999 | Schmidt | |
| 5,996,800 A * | 12/1999 | Pratt | 206/524.8 |
| 6,090,422 A | 7/2000 | Taragan | |
| 6,148,875 A | 11/2000 | Breen | |
| 6,264,054 B1 | 7/2001 | Miyake | |
| 6,510,946 B2 | 1/2003 | Gutierrez | |
| 6,904,761 B2 | 6/2005 | Rafalovic | |
| 6,971,418 B2 | 12/2005 | De Costa | |
| 7,048,136 B2 | 5/2006 | Havens | |
| 2001/0045096 A1 * | 11/2001 | Tatter | 62/129 |
| 2003/0024278 A1 | 2/2003 | Berkey | |
| 2007/0234754 A1 | 10/2007 | Pimputkar et al. | |
| 2008/0006041 A1 | 1/2008 | Nakata | |

FOREIGN PATENT DOCUMENTS

| | | |
|---|---|---|
| EP | 0405680 A2 | 1/1991 |
| EP | 0440296 A1 | 8/1991 |
| EP | 0545246 A2 | 6/1993 |
| JP | 2000-2479 A1 | 1/2000 |
| JP | 2001-013837 | 1/2001 |
| JP | 2004085004 A | 3/2004 |
| WO | 90/13779 A1 | 11/1990 |
| WO | 96/31746 A1 | 10/1996 |
| WO | 01/71263 A1 | 9/2001 |
| WO | 2005/057103 | 6/2005 |

OTHER PUBLICATIONS

European Search Report and Examination mailed Feb. 20, 2012 in EP 06 72 0029.

* cited by examiner

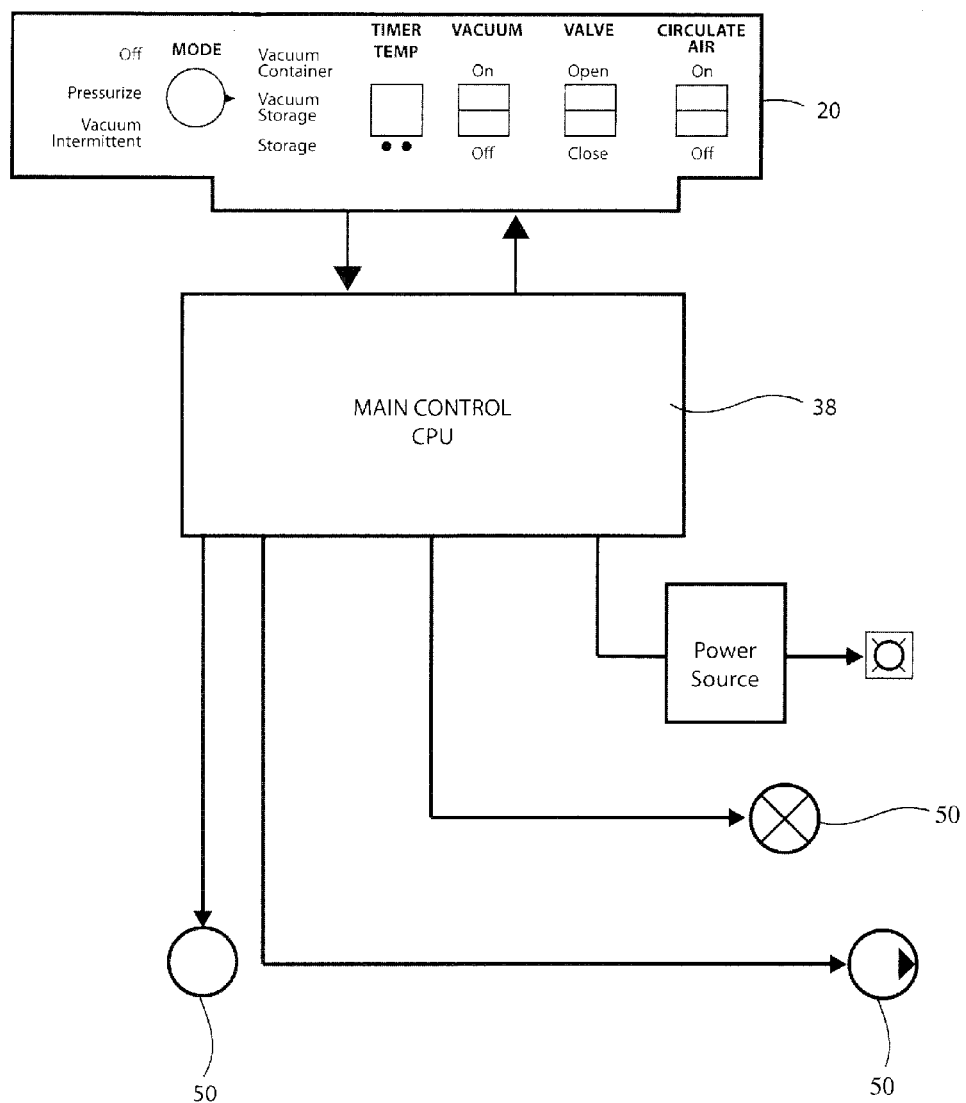
Figure 6 (New)

VACUUM STORAGE APPARATUS WITH SLIDING DRAWERS

FIELD OF THE INVENTION

The invention relates to storing perishable foods and goods and, more particularly, to a modular vacuum storage apparatus and method for storing, dispensing, preserving and shipping perishable items.

BACKGROUND OF THE INVENTION

Removing heat from perishable foods and goods prior to storing or shipping them is a well-known technique with proven efficacy. Perishable goods are now stored or shipped routinely in all parts of the world. These measures can be enhanced by modifying and monitoring not only temperature, but also vacuum, humidity and gas mix levels in the surrounding food storage environment.

U.S. Pat. No. 5,946,919, issued to McKinney, et al., for FOOD CONSERVATOR SYSTEM on Sep. 7, 1999, discloses a single vacuum compartment appropriate for storing baked goods, in which a negative pressure of 10" Hg is maintained and wherein a humidity level of "at least about" 60% relative humidity is maintained. The environment of the compartment is feedback-controlled by a microprocessor. The microprocessor can control vacuum, relative humidity, temperature, the amount of ozone introduced into the compartment to retard bacterial growth, as well as, out-gassing time cycles. A menu allows a user to input data used to control the microprocessor, and permit optimization of the compartment environment for the particular foodstuffs presently being stored.

McKINNEY, et al., can include an ozone ultraviolet generator, a humidifier unit, and/or an activated charcoal chamber. Generating ozone and ultraviolet radiation helps retard or kill mold spores and other undesired components that may be present. The inclusion of an activated charcoal chamber helps further combat odors and removes carbon dioxide by-products.

The enclosure or compartment of McKINNEY, et al., however, has no mechanism for separating foodstuff or for accessing certain perishable items without accessing all of them. This is a serious drawback, as the vacuum is released when the front door is opened. Moreover, the temperature of all remaining perishable items is affected by the door opening in order to access other items or insert them into the container. Likewise, humidity is affected by such actions.

It would be advantageous to provide a perishable food and goods storage system capable of maintaining multiple compartments at predetermined vacuum, temperature, humidity and gas mix levels.

It would also be advantageous to provide a storage system that could accommodate a plurality of perishable foodstuff.

It would further be advantageous to provide a storage system that has a number of individually movable, modular drawers, each drawer being capable of holding different items.

It would still further be advantageous to provide a storage system with individual, movable, modular drawers with a single environmental control unit for the entire system.

It would still be further advantageous to provide a storage and dispensing system that uses one-way valve (or similar functioning mechanism) containers and/or bags to store, preserve and dispense items.

It would still be further advantageous to provide a system that automatically creates, maintains and releases various environments in respective storage units by modifying parameters such as: temperature, humidity, vacuum and gas mix levels and combinations thereof.

It would also be advantageous to program the apparatus to automatically turn off a particular operating system during peak usage to conserve electricity or for operation during specific time periods and intervals.

SUMMARY OF THE INVENTION

In accordance with the present invention, there is provided an apparatus for storing, preserving and dispensing perishable and degradable food, goods and materials for residential, commercial, and industrial applications. A rigid housing is provided, in which at least one modular unit is disposed. Physically removed from the modular unit is a vacuum pump for creating a partial vacuum environment. Optionally provided are operating systems to create, monitor, and maintain: temperature, humidity, and gas mix levels in the storage unit.

In the preferred embodiment, the modular unit is a slidable drawer. Moreover, more than one drawer can be provided, each drawer stacked above one another and all of the drawers being operatively connected to the vacuum pump and optionally to the temperature and humidity control device and the gas sourcing system.

The modular units can be either storage or processing units. The processing unit is designed to create a partial vacuum in one-way valve or similar functioning bags and containers placed into the unit.

The apparatus housings include closed and open frames and/or rack systems to hold single or multiple modular units. The modular units are standardized in size and coupling in order to allow the units to be moved from one housing to another. When a unit is removed from a closed housing another unit can replace it, or a cover can be placed into the housing opening to seal it. The removed modular units can be connected to portable operating systems and can be disposed side-by-side, like books on a shelf; or vertically stacked, like drawers in a dresser.

Furthermore, an apparatus can consist of a combination of processing and/or storage units and a closed housing can provide said units with or without a range of temperature.

BRIEF DESCRIPTION OF THE DRAWINGS

A complete understanding of the present invention may be obtained by reference to the accompanying drawings, when considered in conjunction with the subsequent detailed description in which:

FIG. 6 illustrates a control panel having a display panel and microprocessing unit connected to sensors.

DESCRIPTION OF THE PREFERRED EMBODIMENT

The invention can substantially extend the shelf-life, freshness and quality of a wide range of perishable and degradable items by controlling and/or eliminating their exposure to oxidation, moisture, insects, spoilage bacteria and other organic and non-organic chemical reactions that degrade items and accelerate ripening and decay.

The invention features a modular apparatus for storing, preserving and dispensing perishable and degradable food and goods. A rigid housing is provided, in which at least one modular unit is disposed. Physically removed from the modular unit is a vacuum pump for creating a partial vacuum; a temperature control unit for creating and maintaining a range of temperature (for closed housings); a humidity control unit for maintaining or modifying the humidity level; and a gas sourcing system for introducing and modifying the gas mix levels in each modular unit.

The apparatus offers a combination of unit environment settings applicable to preserve a wide range of perishable items. Multiple, independent and sealable drawers each have unique, preset storage environments depending upon use requirements. Each storage unit is engineered to store and preserve a particular type of perishable or degradable item. For example, food groups can consist of, but are not limited to: (1) breads and pastries; (2) dry goods (e.g., cereals, grains, herbs, coffee, etc.; (3) fruit; (4) vegetables; (5) meats; and (6) cheeses.

Figure 2:
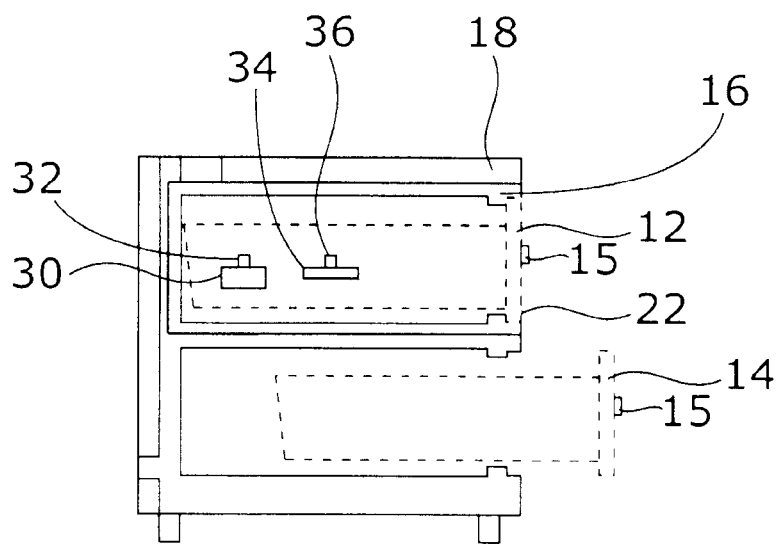
FIG. 2 is a side, cross section view of one embodiment of the invention.

The container processing unit is a modular unit designed to create a partial vacuum in one-way valve bags 34 and containers 30 (or variations thereof) to preserve the contents therein yet still store perishable items, as shown in FIG. 2. The one-way valves are shown at 32 for the container 30 and at 36 for bag 34.

When a processing unit is closed and sealed with a container inside, a sufficient preset partial vacuum is created within the processing unit, to in turn, create a partial vacuum environment within each respective container placed into the processing unit. When the processing unit is opened, the partial vacuum therein is automatically released; however, each processed container maintains its unique storage environment. The containers can then be inventoried either in the processing unit in a storage unit, or in other storage areas (e.g., the refrigerator, pantry, etc.).

The method for storing, preserving, and dispensing perishable and degradable food and goods consists of the following steps. The operator places the items to be preserved or stored into a one-way valve (or similar functioning mechanism) container or bag (or variation thereof) and then closes and seals the container or bag. The operator then places the bag or container into the processing unit and then closes and seals the processing unit. The processing unit then creates a sufficient vacuum environment within the unit, to in turn, create a partial vacuum within each one-way valve container or bag in the processing unit. When the processing unit is opened and the partial vacuum is released, each bag or container retains its unique storage environment until the bag or container is opened. Single or multiple bags and containers can be processed simultaneously. This method is applicable to any compartment or space that can create a vacuum or partial vacuum.

The inventive apparatus is scalable. In the preferred embodiment the apparatus consists of single or multiple independent, sealable processing and/or storage units that operate mechanically as drawers. Each unit is affixed into an insulated housing in which a temperature control system circulates air around the respective unit. In alternate embodiments, each unit can be removed from its respective housing, while retaining its sealed environment, and can stand alone, be placed in another housing or can be connected to portable humidity, vacuum and gas operating systems.

The units can be vertically or horizontally attached to other units using interlocking mechanisms. The appartus' components, housings, modular units, and operating systems can be standardized and interchangeable.

Each processing and storage unit consists of preset and independent environments that are controlled, monitored and maintained by a centralized, preset programmable, microprocessing unit (CPU). The CPU communicates with the operating systems and the sensors and controls in each respective modular unit to create unique partial vacuum storage environments that may be modified by humidity, gas sourcing and temperature systems.

Operating systems are located outside of the respective storage unit environment.

Each operating system connects to the CPU and the respective storage unit. The operating systems consist of a commonly shared vacuum pump and optionally a combination of any of the following: temperature control system (in the closed housing), relative humidity system, and gas sourcing system. The operating systems can also include ozone, filtration systems (e.g., activated charcoal) and any other systems to minimize odor and control bacterial growth.

Figure 1:
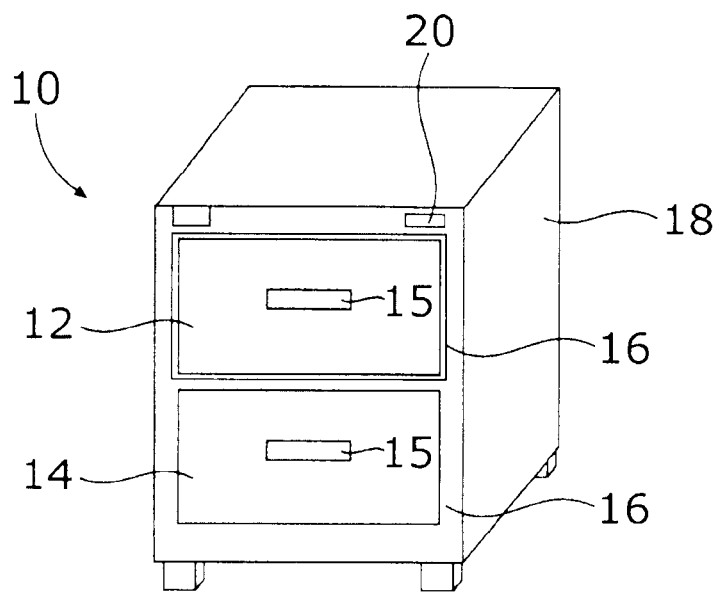
FIG. 1 is a perspective view of the apparatus in accordance with the invention.

Referring now to FIG. 1, the preferred embodiment contemplates single or multiple drawers, and here is shown a vacuum storage apparatus 10 with two slidable drawers 12, 14, each having a handle/latch mechanism 15, in a sealable storage unit 16 that is affixed to an insulated rigid housing 18. At least one of the drawers 12, 14 is slidable and can be removed from the storage unit 16. Air is circulated around each storage unit 16 in the housing 18 with the respective functions controlled and monitored by sensors 50 (FIG. 3) via a control panel 20. In this embodiment, the modular unit described above comprises the storage unit 16 containing the drawer 14.

Referring now to FIG. 2, when a storage unit 16, shown having a drawer 12 to provide a sealed space, is removed (shown in FIG. 4), a created environment within the storage unit 16 and drawer can be maintained. In this embodiment, the modular unit described above comprises the storage unit 16 containing the drawer 12. The drawer 14 is shown in FIG. 2 as being sealed within the rigid housing 18 and not within a storage unit 16 and, thus, in this embodiment, the modular unit described above comprises the drawer 14 without a storage unit 16. Furthermore, the storage unit 16 can be placed into other rigid housings such as closed or open frames and rack systems or function independently of any housing. The storage unit 16 when removed from its rigid housing can be vertically and/or horizontally stacked and connected to portable vacuum, gas sourcing and humidity operating systems. The storage unit 16 is removed from or replaced into the rigid housing 18 by use of manual connection fittings and retractable operating system lines for the respective storage unit functions (vacuum, humidity, gas mix and control panel), in a manner well known in the art.

Figure 4:
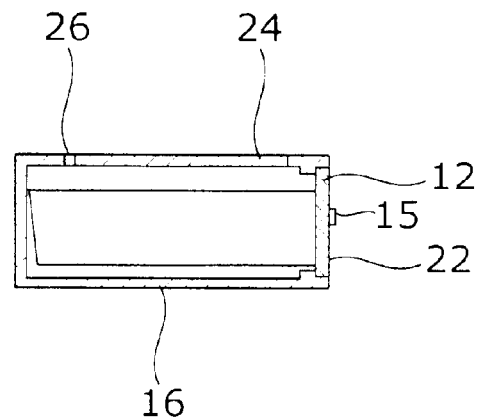
FIG. 4 is a side, cross section view of a modular unit shown in FIG. 2 removed from the rigid housing.

A hinged door 22 can optionally be provided to seal the housing 18 holding the storage unit 16 to maintain the temperature for the housing and unit, which is shown in FIG. 4.

Storage unit 16 can also include a removable or hinged top 24 (shown in FIG. 4) that opens and closes the storage space. When the lid 24 is closed, a seal, not shown, allows a partial vacuum to be created. When the lid 24 is opened, to add or remove items, the vacuum environment is released. The removable or hinged top 24 can also include latches 26 (shown in FIG. 4).

Figure 3:
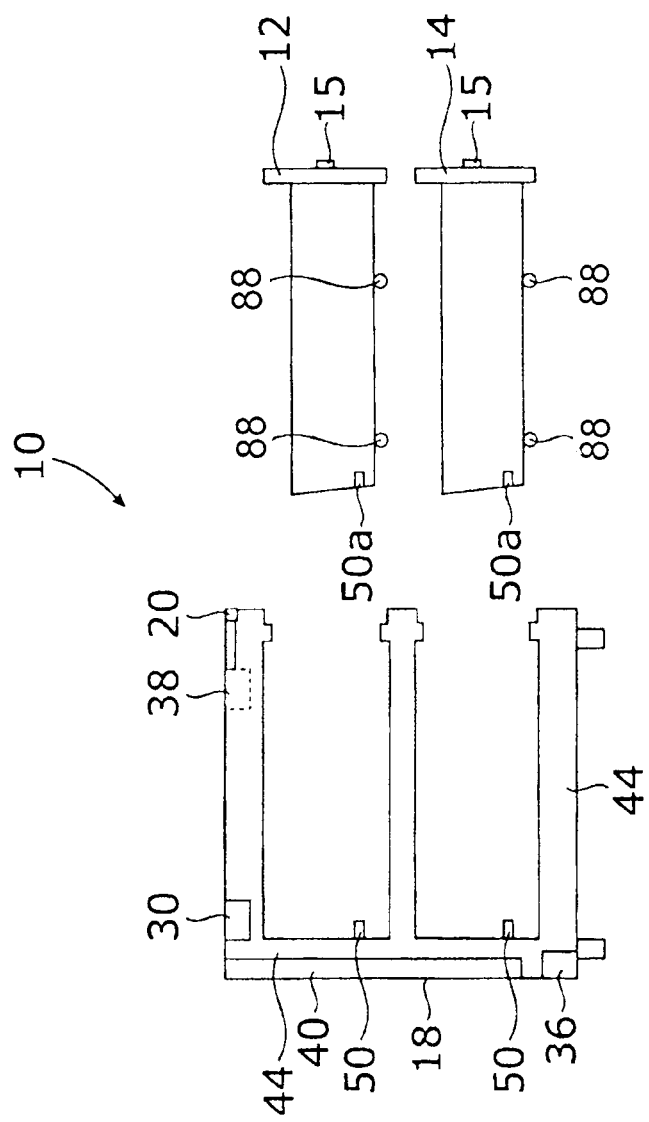
FIG. 3 is a side, cross section view of an alternate embodiment of the invention.

Referring now to FIG. 3, there is shown the apparatus 10 with drawers 12, 14 removed from housing 18. A well or reservoir 30 is provided with a suitable lid, not shown, for receiving water for use by a humidifier, not shown, operatively connected to or in housing 18. Rollers 88 are rotatably affixed to the lower portion of each drawer 12, 14 or into housing 18 to facilitate sliding thereof. In this embodiment, the modular unit described above comprises the drawers 12 and 14 without the use of storage unit 16.

Also integral with housing 18 is a vacuum pump 36, electrically operated under control of a microprocessor 38 and display panel 20. A hot/cold temperature control subsystem 40 is disposed at the rear of housing 18 and, again, operated under control of a microprocessor 38 and display panel 20. A humidity line 44 is attached to each respective drawer 12, 14 when seated in housing 18 to create and maintain the desired level or range of humidity therein.

Temperature, vacuum, gas mix and humidity sensors 50 are provided for each storage unit 12, 14 supported by housing 18. The bank of sensors 50 is electrically connected to microprocessor 38. In the preferred embodiment, sensors 50 are also connected to suitable valves and couplings that mate with respective sockets 50a on the rear portions of drawers 12, 14. Other configurations of sockets, sensors, valves and couplings can also be devised, depending upon the preferences and goals of the manufacturer.

Figure 5:
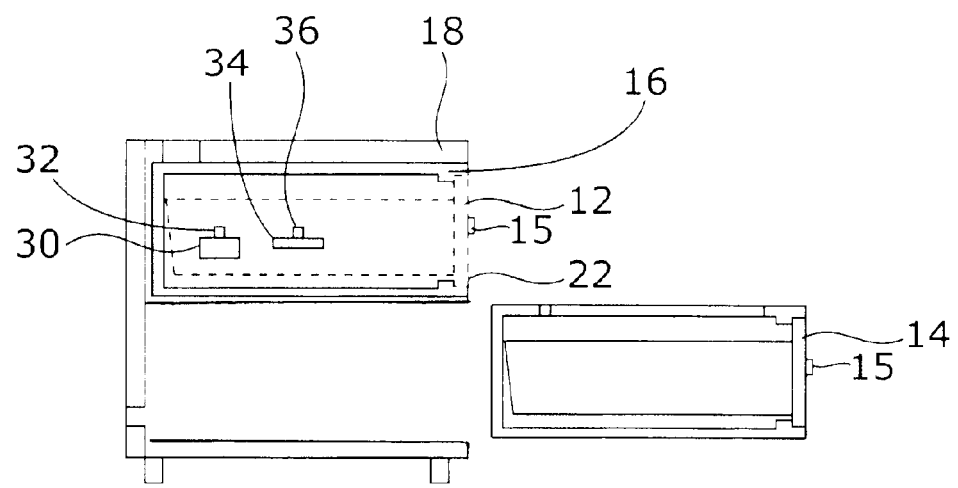
FIG. 5 is a side, cross section view of an alternate embodiment of the invention.

FIG. 4 illustrates the modular unit comprising a storage unit 16 (also shown in FIG. 2) removed from the rigid housing (shown at 18 in FIG. 2). The storage unit 16 is shown with the optional hinged top 24 and latches 26. FIG. 5 illustrates the storage unit 16 in relation to the housing 18.

Since other modifications and changes can vary to fit particular operating requirements and environments and will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An apparatus for storing, preserving and dispensing perishable and degradable food and goods comprising:
   a) a rigid housing;
   b) at least one modular unit disposed in said housing for holding items;
   c) at least one container or bag within the modular unit, the at least one container or bag being constructed to contain perishable and degradable food and goods;
   d) means operatively connected to said modular unit for creating a predetermined partial vacuum level within the modular unit and then concurrently allowing the pressure to increase within said modular unit;
   [e) a valve, separate from the vacuum means, in communication with the modular unit automatically allowing the pressure in the modular unit to increase after a predetermined partial vacuum level is created;]and
   f) means for sealing and maintaining said partial vacuum within the modular unit, wherein said container or bag includes a one-way valve such that when a partial vacuum is created within the modular unit a partial vacuum is also created within the container or bag and retained within the container or bag when the pressure in said modular unit is increased.

2. The apparatus for storing, preserving and dispensing perishable and degradable food and goods in accordance with claim 1, wherein said apparatus comprises a control system that is programmable and provides preset environment settings to operate the apparatus and each operating system to create, regulate and maintain the temperature, vacuum, gas and humidity levels, and combinations thereof, for the respective environments for each storage and processing unit.

3. The apparatus for storing, preserving and dispensing perishable and degradable food and goods in accordance with claim 1, wherein the apparatus is a compartment of a refrigerator, a drawer, a countertop apparatus, or a stand-alone apparatus.

4. The apparatus for storing, preserving and dispensing perishable and degradable food and goods in accordance with claim 1, further comprising means operatively connected to said modular unit for creating and maintaining a predetermined temperature inside the rigid housing.

5. The apparatus for storing, preserving and dispensing perishable and degradable food and goods in accordance with 2, further comprising a control panel to activate said vacuum means to create a predetermined partial vacuum level inside the storage unit and the one or more containers or bags inside said storage unit.

6. The apparatus for storing, preserving and dispensing perishable and degradable food and goods in accordance with 2, further comprising a control panel to automatically deactivate said vacuum means upon creating a partial vacuum level inside said storage unit to concurrently allow the pressure within the storage unit to increase while the one or more containers or bags maintain said partial vacuum environments.

7. The apparatus for storing, preserving and dispensing perishable and degradable food and goods in accordance with claim 1, further comprising a drawer slidably supported for movement between a retracted and extended position into and out of the storage unit and including a plurality of interconnected walls defining a storage space, one of the plurality of interconnected walls comprising a front wall.

8. The apparatus for storing, preserving and dispensing perishable and degradable food and goods in accordance with claim 1, further comprising a lid constructed to move between a closed and open position on said modular unit wherein said modular unit is arranged to move on a supporting structure between a retracted and an extracted position whereby said lid is adapted to pass from a closed position to an open position as a consequence of said modular unit moving from a retracted position to said extracted position and said lid is adapted to pass from an open position to a closed position upon movement of said modular unit from an extracted position to a retracted position.

9. A vacuum system for storing, preserving and dispensing perishable and degradable food and goods having at least one of two selectable operational conditions of operation comprising:
   a sealable modular unit;
   a vacuum means;
   a control system; and
   at least one one-way valve container or bag, the at least one container or bag being constructed to contain perishable and degradable food and goods, wherein a first operational condition of operation wherein a vacuum means is actuated to create a predetermined partial vacuum level inside a modular unit and upon creating said maximum partial vacuum level inside said modular unit said vacuum means is deactivated to concurrently allow the pressure within the modular unit via a valve to increase or a second selectable operational condition of operation wherein a vacuum means is actuated to and maintain a predetermined partial vacuum level inside said modular unit.

10. The apparatus for storing, preserving and dispensing perishable and degradable food and goods in accordance with 9, further comprising a rigid housing in which a modular unit is disposed.

11. The apparatus for storing, preserving and dispensing perishable and degradable food and goods in accordance with claim 10, further comprising means operatively connected to said modular unit for creating and maintaining a predetermined temperature in said rigid housing.

12. The apparatus for storing, preserving and dispensing perishable and degradable food and goods in accordance with 9, further comprising a valve in communication with the modular unit automatically increasing the pressure inside said modular unit while the one or more containers or bags maintain said partial vacuum environments.

13. The vacuum system for storing, preserving and dispensing perishable and degradable food and goods according to 9, further comprising a drawer slidably supported for movement between a retracted and extended position into and out of the storage unit and including a plurality of interconnected walls defining a storage space, one of the plurality of interconnected walls comprising a front wall.

14. An apparatus for storing, preserving and dispensing perishable and degradable food and goods comprising:
 a) a storage unit for holding items;
 b) means for sealing and maintaining a partial vacuum inside said storage unit;
 c) at least one container or bag, each having a one-way evacuation valve, disposed in said storage unit, the at least one container or bag being constructed to contain perishable and degradable food and goods;
 d) means operatively connected to said storage unit for creating a predetermined partial vacuum level inside said storage unit when said vacuum means is actuated and then concurrently allowing the pressure to increase via a valve within said modular unit after said vacuum means is deactivated; and
 e) a control panel operatively connected to said vacuum means.

15. The apparatus for storing, preserving and dispensing perishable and degradable food and goods in accordance with 14, further comprising a rigid housing in which a storage unit is disposed.

16. The apparatus for storing, preserving and dispensing perishable and degradable food and goods in accordance with 14, further comprising means operatively connected to said storage unit for creating and maintaining a predetermined temperature in said rigid housing.

17. The apparatus for storing, preserving and dispensing perishable and degradable food and goods in accordance with 14, further comprising a valve in communication with said storage unit automatically increasing the pressure inside said storage unit after a partial vacuum is created while the one or more containers or bags maintain said partial vacuum environments.

18. The apparatus for storing, preserving and dispensing perishable and degradable food and goods in accordance with 14, further comprising a control panel to activate said vacuum means to create a predetermined partial vacuum level inside the storage unit and the one or more containers or bags.

19. The apparatus for storing, preserving and dispensing perishable and degradable food and goods in accordance with 14, further comprising a control panel to automatically deactivate said vacuum means upon creating a partial vacuum level inside said storage unit to concurrently allow the pressure to increase while the one or more containers or bags maintain said partial vacuum environments.

20. The apparatus for storing, preserving and dispensing perishable and degradable food and goods in accordance with 14, further comprising a drawer slidably supported for movement between a retracted and extended position into and out of the storage unit and including a plurality of interconnected walls defining a storage space, one of the plurality of interconnected walls comprising a front wall.

21. A method for storing, preserving and dispensing perishable and degradable food and goods in a vacuum system including a sealable storage unit comprising the following steps:
 a) placing one or more containers or bags each having a one-way valve into a storage unit, the one or more containers or bags being constructed to contain perishable and degradable food and goods;
 b) closing and sealing said storage unit;
 c) actuating through a control panel a vacuum means in communication with the storage unit to create a predetermined partial vacuum level within the storage unit space, wherein a partial vacuum environment is simultaneously created inside the one or more containers or bags via respective one-way valves; and
 d) automatically deactivating the vacuum means through said control panel upon creating a predetermined partial vacuum level within the storage unit to then concurrently allow the pressure within the storage space to increase via a valve while the one or more containers or bags maintain their respective vacuum environments.

22. A method of sealing a container or bag in a vacuum system for storing, preserving and dispensing perishable and degradable food and goods comprising:
 a) providing a storage unit having a sealable storage space;
 b) placing a container or bag, each with a one-way valve, into said storage unit to allow a partial vacuum to be created inside of the container or bag when a partial vacuum is created inside of said storage unit, the container or bag being constructed to contain perishable and degradable food and goods;
 c) actuating through a control panel a vacuum means in communication with the storage unit to create a predetermined partial vacuum level within the storage unit space, wherein a partial vacuum environment is simultaneously created inside the one or more containers or bags via respective one-way valves;
 d) automatically deactivating the vacuum means through said control panel upon creating a predetermined partial vacuum level within the storage unit to then concurrently allow the pressure within the storage space to increase via a valve while the one or more containers or bags maintain their respective vacuum environments; and
 e) removing the container or bag from the storage unit.

* * * * *

UNITED STATES PATENT AND TRADEMARK OFFICE
CERTIFICATE OF CORRECTION

PATENT NO. : 8,915,093 B2
APPLICATION NO. : 13/771174
DATED : December 23, 2014
INVENTOR(S) : Edward P. Espinosa Page 1 of 1

It is certified that error appears in the above-identified patent and that said Letters Patent is hereby corrected as shown below:

In the claims,

Claim 1, column 5, lines 52-55: delete "[e) a valve, separate from the vacuum means, in communication with the modular unit automatically allowing the pressure in the modular unit to increase after a predetermined partial vacuum level is created;]"

Claim 1, column 5, line 56: replace "f)" with "e)"

Claim 2, column 5, line 65: replace "system" with "panel"

Claim 6, column 6, line 23: replace "2" with "claim 2"

Claim 9, column 6, line 54: replace "system" with "panel"

Claim 9, column 6, lines 57-58: replace "first operational condition of operation wherein a vacuum" with "first selectable operational condition of operation a vacuum"

Claim 9, column 6, line 65: replace "to and maintain" with "to create and maintain"

Claim 10, column 7, line 3: replace "9" with "claim 9"

Claim 12, column 7, line 12: replace "9" with "claim 9"

Claim 13, column 7, line 18: replace "9" with "claim 9"

Claim 15, column 7, line 42: replace "14" with "claim 14"

Claim 16, column 7, line 46: replace "14" with "claim 14"

Signed and Sealed this
Twenty-first Day of April, 2015

Michelle K. Lee
*Director of the United States Patent and Trademark Office*